United States Patent
Chinchalkar et al.

(10) Patent No.: US 8,261,243 B2
(45) Date of Patent: Sep. 4, 2012

(54) SELECTIVE EXECUTION OF TRACE MECHANISMS FOR APPLICATIONS HAVING DIFFERENT BIT STRUCTURES

(75) Inventors: Avinash Srikrishna Chinchalkar, Bangalore (IN); Balamurugan Ramajeyam, Chennai (IN); Muthulakshmi Pearl Srinivasan, Austin, TX (US); Suresh Eswara Warrier, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1058 days.

(21) Appl. No.: 12/189,831

(22) Filed: Aug. 12, 2008

(65) Prior Publication Data

US 2010/0042977 A1 Feb. 18, 2010

(51) Int. Cl.
*G06F 9/44* (2006.01)
*G06F 9/45* (2006.01)

(52) U.S. Cl. .......................... 717/128; 717/126; 717/131

(58) Field of Classification Search ........... 717/124–131
See application file for complete search history.

(56) References Cited

U.S. PATENT DOCUMENTS

| | | | |
|---|---|---|---|
| 5,649,203 A | 7/1997 | Sites | |
| 6,058,393 A * | 5/2000 | Meier et al. | 717/124 |
| 6,324,683 B1 * | 11/2001 | Fuh et al. | 717/124 |
| 6,721,941 B1 * | 4/2004 | Morshed et al. | 717/127 |
| 6,760,903 B1 * | 7/2004 | Morshed et al. | 717/130 |
| 6,898,784 B1 * | 5/2005 | Kossatchev et al. | 717/126 |
| 6,966,052 B1 * | 11/2005 | Grindeland et al. | 717/131 |
| 7,013,456 B1 * | 3/2006 | Van Dyke et al. | 717/130 |
| 7,124,286 B2 * | 10/2006 | McGrath et al. | 712/229 |
| 7,260,815 B1 * | 8/2007 | Chen et al. | 717/134 |
| 7,278,137 B1 | 10/2007 | Fuhler et al. | |
| 7,340,726 B1 * | 3/2008 | Chelf et al. | 717/126 |
| 7,506,315 B1 * | 3/2009 | Kabadiyski et al. | 717/128 |
| 7,568,186 B2 * | 7/2009 | Bhattacharya | 717/130 |
| 7,607,123 B2 * | 10/2009 | Chavan | 717/129 |
| 7,644,395 B1 * | 1/2010 | Frey et al. | 717/128 |
| 7,793,267 B2 * | 9/2010 | Davison et al. | 717/128 |

(Continued)

OTHER PUBLICATIONS

Gang et al, "The design of 32 bit floating point RISC microprocessor", IEEE, pp. 760-764, 2001.*

(Continued)

*Primary Examiner* — Anil Khatri
(74) *Attorney, Agent, or Firm* — Yee & Associates, P.C.; David A. Mims, Jr.

(57) ABSTRACT

A computer implemented method, a computer program product, and a data processing system trace information about current context and system state for either 32-bit or 64-bit applications. A 32-bit trace executable code and a 64-bit trace executable code are compiled for a trace script. A determination is then made as to whether an application process is a 32-bit process or a 64-bit process. Responsive to determining that the application process is the 32-bit process or the 64-bit process, an internal indicator is set to indicate the application process as either a 32-bit process or a 64-bit process. Subsequently, the internal indicator is identified as either indicating the 32-bit process or the 64-bit process. If the internal identifier indicates the application process is a 32-bit process, an instruction pointer is set to indicate the 32-bit trace executable code, and the 32-bit trace executable code is executed. If the internal identifier indicates the application process is a 64-bit process, an instruction pointer is set to indicate the 64-bit trace executable code, and the 64-bit trace executable code is executed.

16 Claims, 6 Drawing Sheets

U.S. PATENT DOCUMENTS

| | | | | |
|---|---|---|---|---|
| 7,908,463 B2* | 3/2011 | Lie | | 712/210 |
| 7,950,004 B2* | 5/2011 | Vieira et al. | | 717/125 |
| 8,006,204 B2* | 8/2011 | Killian et al. | | 716/100 |
| 2005/0114639 A1 | 5/2005 | Zimmer | | |

OTHER PUBLICATIONS

Glazar et al, "Active instrument controller with script intreprter", IEEE Trans. on Instru. and Measurment, vol. 58, No. 10, pp. 3527-3533, 2009.*

Chang, "Experiments and investigations for the personal high performance computing (PHPC) built on top of the 64 bit processing and clustring system", IEEE, pp. 1-2, 2006.*

Chang et al, Tracing for web 3.0, Trace compilation for the next generation web applicationss:, ACM VEE, pp. 71-80, 2009.*

Krishnaswamy et al, "Enhancing the performance of 16 bit code using augmenting instructions", ACM LCTES, pp. 254-264, 2003.*

Kubde et al, "Design of 32 bit (MIPS) PISC processor using FPGA", ACM ICWET, pp. 936-939, 2010.*

* cited by examiner

SELECTIVE EXECUTION OF TRACE MECHANISMS FOR APPLICATIONS HAVING DIFFERENT BIT STRUCTURES

BACKGROUND OF THE INVENTION

1. Field of the Invention

The present invention relates generally to a computer implemented method, a computer program product, and a data processing system. More specifically, the present invention relates to a computer implemented method, a computer program product, and a data processing system for selective execution of trace mechanisms for applications having different bit structures.

2. Description of the Related Art

A probe or trace is a software mechanism that interrupts normal system action to investigate and obtain information about current context and system state. Tracing actions or probe actions refer to the actions performed by the trace. Typically, they include the capturing of information by writing the current values of global and context-specific information to a trace buffer. The obtained information, thus captured in the trace buffer, is called trace data. The system usually provides facilities to consume the trace, that is, read the data out of the trace buffer and make it available to the users of the system.

A trace point identifies a point during normal system activity that is capable of being traced. With dynamic tracing, trace points do not have any probes attached to them unless they are being traced. Enabling a trace is the operation of attaching a probe to a trace point and disabling a trace is the operation of removing a probe from a trace point. Triggering or firing of a probe refers to the condition where an enabled trace point occurs during system activity and the tracing actions are performed.

Dynamic tracing requires tracing actions to be executed dynamically. The tracing actions are often written in a programming language and usually compiled into machine code or byte code, which is then loaded into the Operating System. At the time a trace point is triggered, this machine code or byte code for the trace is executed, which allows for the efficient execution of trace actions. Attempting to interpret and execute trace actions at the time a trace point is triggered incurs the extra overhead involved in translating the code into machine code.

An important requirement for tracing is the ability to access the values of global variables, input parameters to a function being traced, return values from functions being traced and other context data at the trace point in an application that is being traced. There are two common data models available for applications on most modern operating systems: the 32-bit and the 64-bit data models. Accordingly, compilers on AIX and other operating systems, support converting a program written in the high-level language into either a 32-bit or 64-bit binary executable. Dynamic tracing must support tracing both 32-bit and 64-bit applications.

Because 32-bit applications and 64-bit applications follow different data models, a problem arises when the same tracing actions code needs to be executed for both 32-bit and 64-bit applications and context or global data in the application must be accessed as part of executing the tracing actions. This problem is specific to compilers that need to generate object code that can be executed in one or more data modes. Standard compilers generating either 32-bit object code to create a 32-bit executable, or generating 64-bit object code to create a 64-bit executable will not experience this problem, although separate 32-bit and 64-bit executables may be created from the same program.

For example, pointers and long variables ("longs") in a 32-bit application assume different sizes than do pointers and longs in a 64-bit application. Consider the case where we put a trace point at entry into a system call, such as "sigaction." The sigaction system call takes a pointer to the sigaction data structure which has the following structure layout (shown here in C language format):

```
struct sigaction {
    void    (*sa_handler (int, siginfo_t *, void *);    /* Signal handler */
    sigset_t sa_mask;       /* signals to block while in handler */
    int sa_flags;   /* signal action flags */
};
```

For a 32-bit application, the sa_handler field is 4 bytes long. The sa_mask field therefore starts at offset 4. However, for a 64-bit application, the sa_handler field is 8 bytes long. The sa_mask field for a 64-bit application therefore starts at offset 8.

Consider the following example of a dynamic tracing program that traces the sigaction system call:

```
int sigaction(int signo, struct sigaction *act, struct sigaction *oact);
@@syscall:*:sigaction:entry       /* Probe the sigaction system call */
{
    struct sigaction *act;
    /* Copy the data passed by the user into our internal data structure,
    * we use __arg2 because the sigaction structure is the
    second argument
    */
    act = get_userdata(__arg1, sizeof(struct sigaction));
    printf("Process %d calls sigaction for signal %d with flags %d\n",
        __pid, __arg1, act->sa_flags);
}
```

In this example, the offset generated in the object code by the compiler for the sa_flags field needs to be different depending upon whether the process or application being traced is 32-bit or 64-bit.

Consider the case of the sizeof( ) operator which returns the size of a variable In AIX, a "unsigned long" variable in a 64-bit application can contain values up to $2^{64}$ bits and a "unsigned long" variable in a 64-bit application is 8 bytes long. However, for a 32-bit application, a "unsigned long" variable can contain only values up to $2^{32}$ bits and the size of the "unsigned long" variable is therefore 4-bytes. The compiler must somehow generate code that returns 4 bytes or 8 bytes depending upon the process that is being traced.

Existing solutions that vary offsets, sizes of variables, etc. depending on whether a 32-bit or 64-bit application is executing the (tracing) code include the following.

The first solution involves creating two tracing modules. The first module is compiled for 32-bit mode having matching 32-bit long/pointer sizes and the second module is compiled for the 64-bit mode having matching 64-bit long/pointer sizes. The user uses the 32-bit module if the applications being traced is 32-bit. The 64-bit module is used instead when tracing 64-bit applications.

This approach is taken by the command-line kdb or the kernel debugger command, which needs to understand both the 32-bit and 64-bit layout of kernel data structures, depending upon whether the user is debugging a 32-bit or 64-bit kernel. It consists of a front-end and both a 32-bit and a 64-bit backend module. When invoked, it first tests the kernel mode—whether 32-bit or 64-bit—and then invokes the appropriate backend module. The problem with this approach is that it does not work well if both 32-bit and 64-bit applications have to be simultaneously traced in a single session.

A second known solution is to incorporate knowledge of application modes into the programming language and have a mode switch implemented as a new statement within the tracing program. For instance, if the same structure was being accessed by both the 32-bit and 64-bit application, the user could define a separate structure for each mode Such a solution could take the form of:

mode 32;
struct x32{ . . . };
mode 64;
struct x64{ . . . };

This second solution thus would require the user to declare the structure twice with two different names. The first declaration would be built in 32-bit format, and the second declaration would be in 64-bit format. This double-declared solution allows the compiler to know about both possibilities simultaneously. The tracing program could then initiate a single appropriate tracing script dealing with both types of objects simultaneously. However, this double-declared solution would require the user to check whether the current process is running in 32-bit mode or 64-bit made within the tracing program and then choose the appropriate structure. Similar considerations would apply when using operators like sizeof( ) on variables.

Thus, the second solution requires the user to handle the 32-bit and 64-bit issue explicitly. All structures and variables for the structures and the actions associated with them must be duplicated for the 32-bit and the 64-bit scenarios. The user would need to know the exact mode of every application being probed. The tracing program would be quite complex and possibilities of errors are high. In the future, when a 32-bit application needs to be compiled into 64-bit mode, all existing tracing programs have to be updated to understand the new mode. Another problem with this solution is if "long long" fields are present in a 32-bit structure, which need to be cast into a pointer (that is treat the "long long" field as a pointer rather than as an integer), because pointers are only 4-bytes long while "long longs" are 8 bytes long, correct casting may require special language constructs to be employed by the user further complicating this solution.

BRIEF SUMMARY OF THE INVENTION

A computer implemented method, a computer program product, and a data processing system trace information about current context and system state for either 32-bit or 64-bit applications. A 32-bit trace executable code and 64-bit trace executable code are compiled for a trace script. A determination is then made as to whether an application process is a 32-bit process or a 64-bit process. Responsive to determining that the application process is the 32-bit process or the 64-bit process, an internal indicator is set to indicate the application process as either a 32-bit process or a 64-bit process. Subsequently, the internal indicator is identified as either indicating the 32-bit process or the 64-bit process. If the internal identifier indicates the application process is a 32-bit process, an instruction pointer is set to indicate the 32-bit trace executable code, and the 32-bit trace executable code is executed. If the internal identifier indicates the application process is a 64-bit process, an instruction pointer is set to indicate the 64-bit trace executable code, and the 64-bit trace executable code is executed.

DETAILED DESCRIPTION OF THE INVENTION

Figure 1:
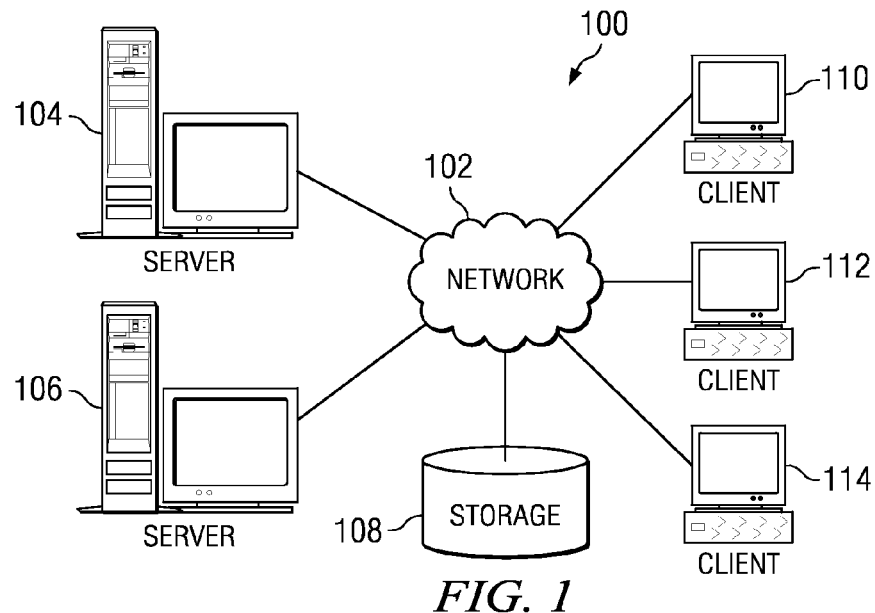
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
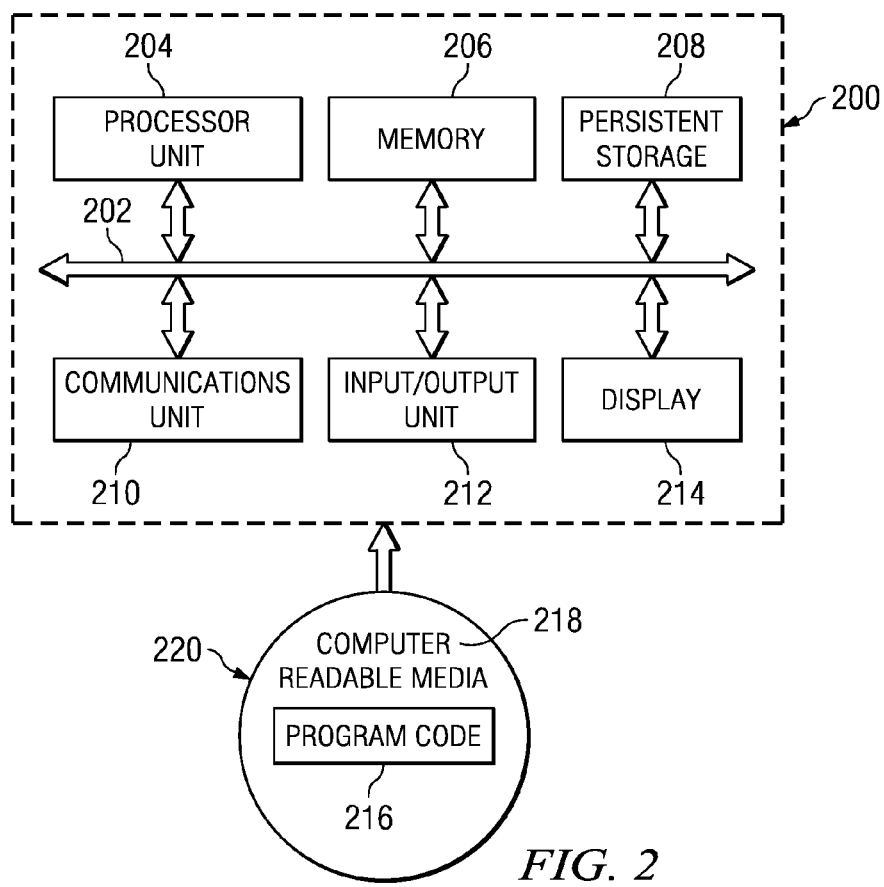
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
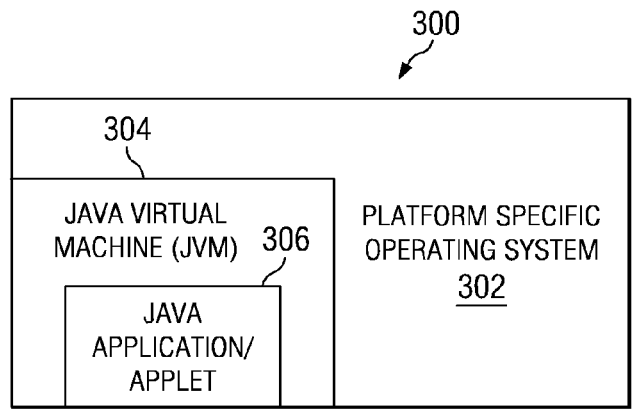
FIG. 3 is a block diagram illustrating the relationship of software components operating within a computer system that may implement the present invention.

With reference now to FIG. 3, a block diagram illustrating the relationship of software components operating within a computer system that may implement the present invention. Java™-based system 300 contains platform specific operating system 302 that provides hardware and system support to software executing on a specific hardware platform. Java™ virtual machine (JVM) 304 is one software application that may execute in conjunction with the operating system. Java™ virtual machine 304 provides a Java™ run-time environment with the ability to execute Java™ application/applet 306, which is a program, servlet, or software component written in the Java™ programming language. The computer system in which Java™ virtual machine 304 operates may be similar to data processing system 200 in FIG. 2 or data processing system 100 in FIG. 1 described above. However, Java™ virtual machine 304 may be implemented in dedicated hardware on a so-called Java™ chip, Java™-on-silicon, or Java™ processor with an embedded picoJava core.

At the center of a Java™ run-time environment is the Java™ virtual machine, which supports all aspects of Java™'s environment, including its architecture, security features, and mobility across networks, and platform independence.

The Java™ virtual machine is a virtual computer, for example, a computer that is specified abstractly. The specification defines certain features that every Java™ virtual machine must implement, with some range of design choices that may depend upon the platform on which the Java™ virtual machine is designed to execute. For example, all Java™ virtual machines must execute Java™ bytecodes and may use a range of techniques to execute the instructions represented by the bytecodes. A Java™ virtual machine may be implemented completely in software or somewhat in hardware. This flexibility allows different Java™ virtual machines to be designed for mainframe computers and PDAs.

The Java™ virtual machine is the name of a virtual computer component that actually executes Java™ programs. Java™ programs are not run directly by the central processor but instead by the Java™ virtual machine, which is itself a piece of software running on the processor. The Java™ virtual machine allows Java™ programs to be executed on a different platform as opposed to only the one platform for which the code was compiled. Java™ programs are compiled for the Java™ virtual machine. In this manner, Java™ is able to support applications for many types of data processing systems, which may contain a variety of central processing units and operating systems architectures. To enable a Java™ application to execute on different types of data processing systems, a compiler typically generates an architecture-neutral file format. This compiled code is executable on many processors, given the presence of the Java™ run-time system. The Java™ compiler generates bytecode instructions that are nonspecific to a particular computer architecture. A bytecode is a machine independent code generated by the Java™ compiler and executed by a Java™ interpreter. A Java™ interpreter is part of the Java™ virtual machine that alternately decodes and interprets a bytecode or bytecodes. These bytecode instructions are designed to be easy to interpret on any computer and easily translated on the fly into native machine code. Byte codes may be translated into native code by a just-in-time (JIT) compiler.

A Java™ virtual machine loads class files and executes the bytecodes within them. The class files are loaded by a class loader in the Java™ virtual machine. The class loader loads class files from an application and the class files from the Java™ application programming interfaces (APIs) which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java™ bytecodes are executed natively. Java™ virtual machines usually interpret bytecodes, but Java virtual machines may also use other techniques, such as just-in-time compiling, to execute bytecodes.

When an application is executed on a Java™ virtual machine that is implemented in software on a platform-specific operating system, a Java™ application may interact with the host operating system by invoking native methods. A Java™ method is written in the Java™ language, compiled to bytecodes, and stored in class files. A native method is written in some other language and compiled to the native machine code of a particular processor. Native methods are stored in a dynamically linked library whose exact form is platform specific.

Figure 4:
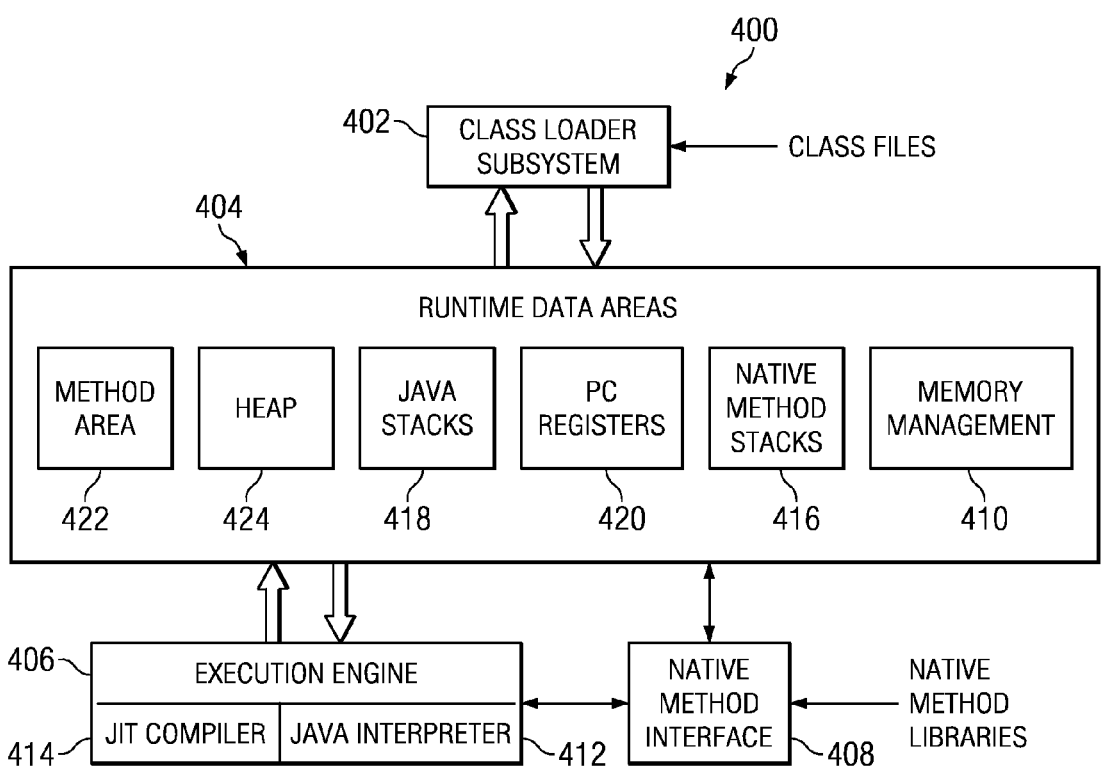
FIG. 4 is a block diagram of a Java™ virtual machine in accordance with an illustrative embodiment.

With reference now to FIG. 4, a block diagram of a Java™ virtual machine is depicted in accordance with an illustrative embodiment. Java™ virtual machine (JVM) 400 includes class loader subsystem 402, which is a mechanism for loading types, such as classes and interfaces, given fully qualified names. Java™ virtual machine 400 also contains runtime data areas 404, execution engine 406, native method interface 408, and memory management 410. Execution engine 406 is a mechanism for executing instructions contained in the methods of classes loaded by class loader subsystem 402. Execution engine 406 may be, for example, Java interpreter 412 or just-in-time compiler 414. Native method interface 408 allows access to resources in the underlying operating system. Native method interface 408 may be, for example, the Java™ Native Interface (JNI).

Runtime data areas 404 contain native method stacks 416, Java™ stacks 418, PC registers 420, method area 422, and heap 424. These different data areas represent the organization of memory needed by Java virtual machine 400 to execute a program.

Java™ stacks 418 are used to store the state of Java™ method invocations. When a new thread is launched, the Java™ virtual machine creates a new Java™ stack for the thread. The Java™ virtual machine performs only two operations directly on Java™ stacks. It pushes and pops frames. A thread's Java™ stack stores the state of Java™ method invocations for the thread. The state of a Java™ method invocation includes its local variables, the parameters with which it was invoked, its return value, if any, and intermediate calculations. Java™ stacks are composed of stack frames. A stack frame contains the state of a single Java™ method invocation. When a thread invokes a method, the Java™ virtual machine pushes a new frame onto the Java™ stack of the thread. When the method completes, the Java™ virtual machine pops the frame for that method and discards it. The Java™ virtual machine does not have any registers for holding intermediate values; any Java™ instruction that requires or produces an intermediate value uses the stack for holding the intermediate values. In this manner, the Java™ instruction set is well-defined for a variety of platform architectures.

Program counter (PC) registers 420 are used to indicate the next instruction to be executed. Each instantiated thread gets its own PC register and Java™ stack. If the thread is executing a Java™ virtual machine method, the value of the PC register indicates the next instruction to execute. If the thread is executing a native method, then the contents of the PC register are undefined.

Native method stacks 416 stores the state of invocations of native methods. The state of native method invocations is stored in an implementation-dependent way in native method stacks, registers, or other implementation-dependent memory areas. In some Java™ virtual machine implementations, native method stacks 416 and Java™ stacks 418 are combined.

Method area 422 contains class data while heap 424 contains all instantiated objects. The constant pool is located in method area 422 in these examples. The Java™ virtual machine specification strictly defines data types and operations. Most Java™ virtual machines choose to have one method area and one heap, each of which are shared by all threads running inside the Java™ virtual machine, such as Java™ virtual machine 400. When Java™ virtual machine 400 loads a class file, it parses information about a type from the binary data contained in the class file. Java™ virtual machine 400 places this type of information into the method area. Each time a class instance or array is created, the memory for the new object is allocated from heap 424. Java™ virtual machine 400 includes an instruction that allocates memory space within the memory for heap 424 but includes no instruction for freeing that space within the memory. Memory management 410 in the depicted example manages memory space within the memory allocated to heap 424. Memory management 410 may include a garbage collector, which automatically reclaims memory used by objects that are no longer referenced. Additionally, a garbage collector also may move objects to reduce heap fragmentation.

A computer implemented method, a computer program product, and a data processing system trace information about current context and system state for either 32-bit or 64-bit applications. A 32-bit trace executable code and 64-bit trace executable code are compiled for a trace script. A determination is then made as to whether an application process is a 32-bit process or the 64-bit process. Responsive to determining that the application process is the 32-bit process or a 64-bit process, an indicator is set to indicate the application process as either a 32-bit process or a 64-bit process. Subsequently, the internal indicator is identified as either indicating the 32-bit process or the 64-bit process. If the internal identifier indicates the application process is a 32-bit process, an instruction pointer is set to indicate the 32-bit trace executable code, and the 32-bit trace executable code is executed. If the internal identifier indicates the application process is a 64-bit process, an instruction pointer is set to indicate the 64-bit trace executable code, and the 64-bit trace executable code is executed.

Figure 5:
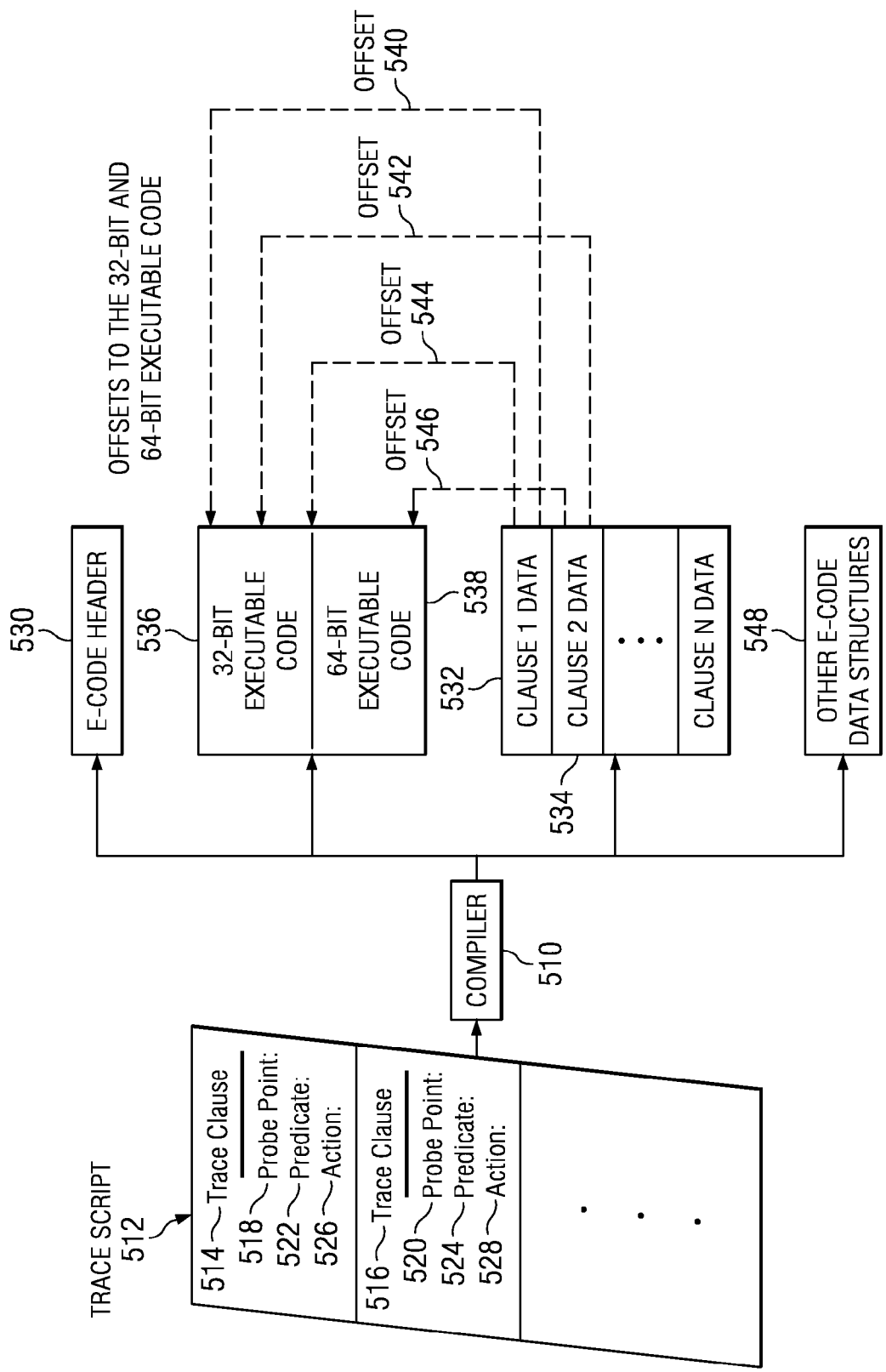
FIG. 5 is a block diagram of a compiler generating code streams for 32-bit and 64-bit applications in accordance with an illustrative embodiment.

Referring now to FIG. 5, a block diagram of a compiler generating code streams for 32-bit and 64-bit applications is shown in accordance with an illustrative embodiment. FIG. 5 is a software component executing on a data processing system, such as data processing system 200 of FIG. 2 and data processing system 100 of FIG. 1.

Compiler 510 is a software component that processes statements written in trace script 512 of a particular programming language and turns them into machine language or "code" that a computer's processor uses. Trace script 512 is a program written in a programming language understandable by compiler 510. Trace script 512 can be used to identify the trace points where a trace is to be dynamically enabled, specify the conditions, if any, which must be satisfied for the actions to be executed when a trace fires, and specify the actions to be executed including what trace data to capture. In short, the trace script tells a trace application where to trace, when to trace and what to trace.

Trace script 512 consists of an optional declaration section followed by one or more trace clauses 514, 516. Each of trace clauses 514, 516 consists of three elements: trace point specification 518, 520, predicate 522, 524, and action 526, 528.

Trace point specification 518, 520 identifies a set of trace point(s) to be dynamically enabled. Trace point specification 518, 520 consists of one or more trace point ordered set of values, or "tuples." Each trace point tuple identifies a code location whose execution or an event whose occurrence should trigger the trace actions. Multiple trace points can be associated with the same set of trace actions and the predicate, if any, by providing list of trace points at the top of one of trace clauses 514, 516.

Predicate 522, 524, if present, identifies a condition that is to be checked at the time the trace is triggered. That is, predicate 522, 524 is used when execution of trace clauses 514, 516 at trace points must be performed conditionally. Predicate 522, 524 must evaluate to TRUE for the trace actions of the clause to be executed.

Action 526, 528 is used to identify the sequence of trace actions to be performed when the trace fires. Action 526, 528 consists of a sequence of statements that are executed in order. Action 526, 528 identifies the trace actions to be performed when the associated trace point is triggered. Supported actions are not restricted to the mere capturing and formatting of trace data.

Compiler 510 compiles trace script 512 into machine executable code streams onto memory locations. Trace header 530 contains supplemental data that provides control and summary information about the generated trace code. Compiler 510 compiles predicates 522 and 524 and actions 526, 528 both as 32-bit code streams, and as 64-bit code streams. 32-bit code streams are stored at 32-bit executable code 536, while 64-bit code streams are stored at 64-bit executable code 538. Compiler 510 also generates clause 1 data 532 for trace clause 514 and clause 2 data 534 for trace clause 516.

Clause 1 data 532 and clause 2 data 534 include offsets to direct applications to the appropriate code stream. If tracing is requested for a 32-bit application, offset 540, 542 direct the trace to the appropriately compiled 32-bit code streams in 32-bit executable code 536. If tracing is requested for a 64-bit application, offset 544, 546 direct the trace to the appropriately compiled 64-bit code streams in 64-bit executable code 538. Other clause data fields can be stored in other trace data structure 548.

Figure 6:
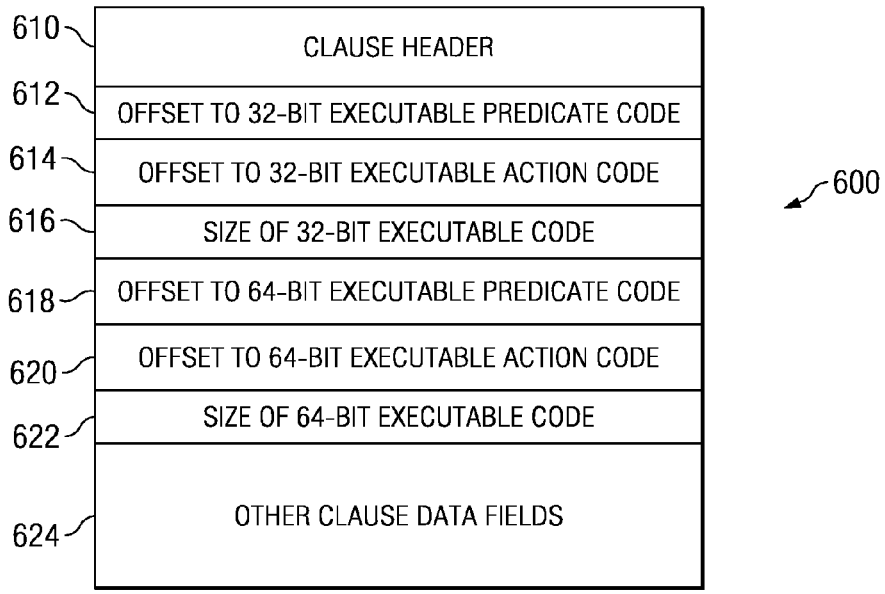
FIG. 6 is an exemplary layout for a trace clause according to an illustrative embodiment.

Referring now to FIG. 6, an exemplary layout for a trace clause is shown according to an illustrative embodiment. Trace clause 600 can be trace clauses 514, 516 of FIG. 5.

Clause header 610 consists of supplemental data that provides summary and control information about trace clause 600. 32-bit predicate offset 612 is an offset within a location containing 32-bit executable code, such as 32-bit executable code 536 of FIG. 5. 32-bit predicate offset 612 points to a compiled 32-bit predicate code for trace clause 600. 32-bit executable offset 614 is an offset within a location containing 32-bit executable code, such as 32-bit executable code 536 of FIG. 5. 32-bit executable offset 614 points to a compiled 32-bit executable code for trace clause 600. 32-bit size 616 is a descriptor of the size of the 32-bit executable code for trace clause 600 within a 32-bit executable code region, such as 32-bit executable code 536 of FIG. 5.

64-bit predicate offset 618 is an offset within trace clause 600 that points to a related compiled predicate code within a location containing 64-bit executable code, such as 64-bit executable code 538 of FIG. 5. 64-bit predicate offset 618 points to a compiled 64-bit predicate code for trace clause 600. 64-bit executable offset 620 is an offset within trace clause 600 that points to a related compiled executable code within a location containing 64-bit executable code, such as 64-bit executable code 538 of FIG. 5. 64-bit executable offset 620 points to a compiled 64-bit executable code for trace clause 600. 64-bit size 622 is a descriptor of the size of a location containing 64-bit executable code, such as 64-bit executable code 538 of FIG. 5.

Other clause data fields can be stored in other data fields 624. Other data fields 624 can be other trace data structure 548 of FIG. 5.

Figure 7:
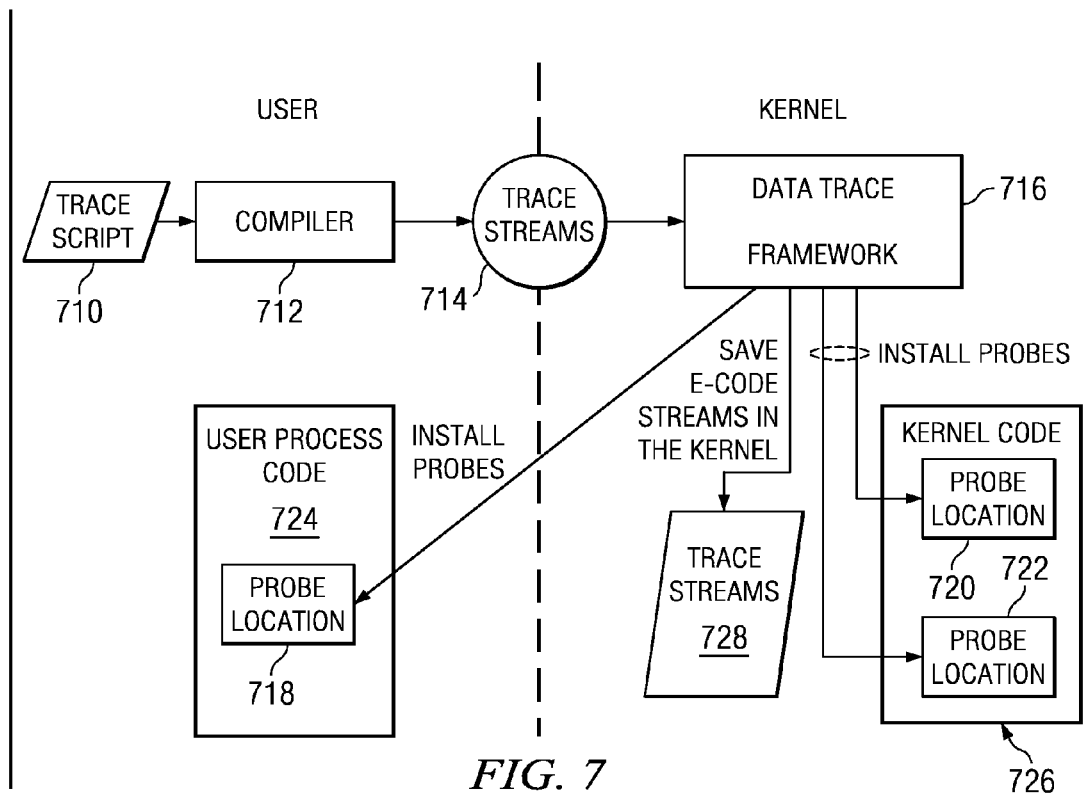
FIG. 7 is a data flow for installing trace traces within various client and kernel processes according to an illustrative embodiment.

Referring now to FIG. 7, a data flow is shown for installing trace traces within various client and kernel processes, according to an illustrative embodiment of the present invention.

Trace script 710, which can be trace script 512 of FIG. 5, is fed into compiler 712, which can be compiler 510 of FIG. 5, to generate trace stream 714. Trace stream 714 includes a header, such as header 530 of FIG. 5, executable code, such as executable code 536, 538 of FIG. 5, clause data, such as clause data 532, 534 of FIG. 5, and any other data, such as other trace data structure 548 of FIG. 5.

The clause data also contains information about the trace point. The trace point is identified using a string. The kernel then understands from the string what the location where you need to put the trace in.

Compiler 712 then passes trace stream 714 into the kernel to a system call. Inside the kernel, data tracing framework 716 determines trace location 718, 720, 722 points within either user process code 724 or kernel code 726 at which to install a trace.

Data tracing framework 716 then saves the different trace streams 728 that correspond to each trace location 718, 720, and 722. Data tracing framework 716 sets a pointer to identify the trace streams. The trace streams can be traced back from a trace identifier, stored in a trace identification data structure, so that the correct stream can be executed when its corresponding trace location, such as trace location 718, 720, 722 is encountered during execution of a user process or a kernel process.

Figure 8:
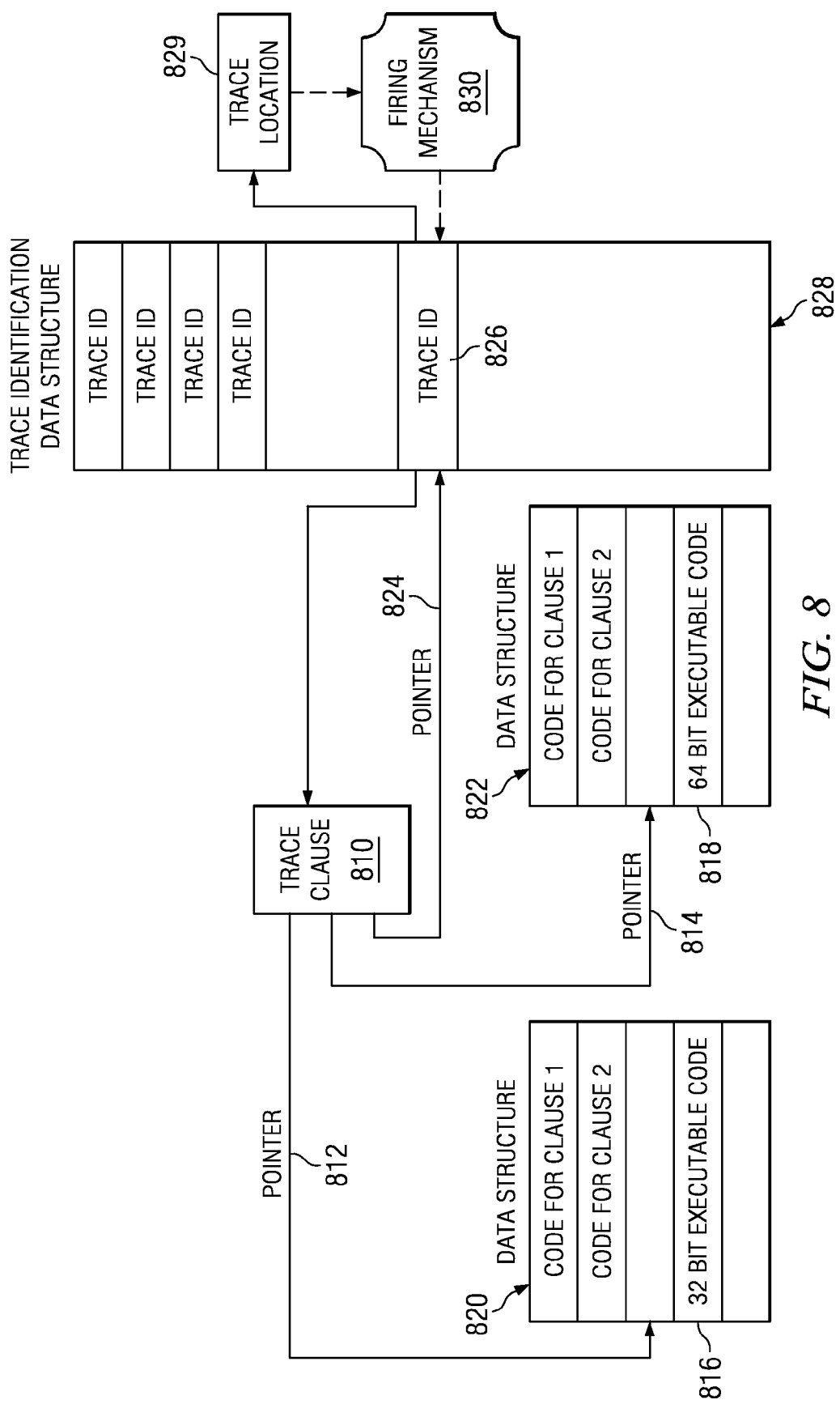
FIG. 8 is a data flow for executing trace traces according to an illustrative embodiment.

Referring now to FIG. 8, a data flow for executing probe traces is shown according to an illustrative embodiment.

Trace clause 810 can be trace clause 600 of FIG. 6. Trace clause 810 has pointers 812, 814 to direct the trace clause to either 32-bit executable code 816 or 64-bit executable code 818. Pointer 812 indicates 32-bit executable code 816 that is contained within data structure 820 and indicates 32-bit executable code for trace clause 810. Data structure 820 contains 32-bit executable code for each of the trace clauses, such as trace clause 810. Pointer 814 indicates 64-bit executable code 818 that is contained within data structure 822 and indicates 64-bit executable code for trace clause 810. Data structure 822 contains 64-bit executable code for each of the trace clauses, such as trace clause 810.

Pointer 824 identifies trace identifier 826 within trace identification data structure 828. Trace identification data structure 828 is a data structure containing an identification of each trace trigger that has been inserted into either the client process code, or the kernel code. When the trace framework, such as trace framework 716 of FIG. 7 installs a trace at a certain trace location, it creates a trace identifier, such as trace identifier 826. The trace identifier is itself an index indicating a trace clause, such as trace clause 600 of FIG. 6.

Each trace identifier, such as trace identifier 826, itself has access to its corresponding trace location, such as trace location 718, 720, and 722 of FIG. 7. The access can be, but is not necessarily a simple pointer. Trace locations are not always straightforward. A trace location can reference information with an effective address that is inside a process, or information with an effective address that is the kernel. A trace location can be an event. In each of these scenarios, a pointer is often not adequate to identify the trace location from the trace identifier. Other methods, such as process or thread IDs, module name within the process, etc. may also be required to uniquely identify the trace location.

Trace location 829 can be one of trace location 718, 720, 722 of FIG. 7. When trace location 829 is encountered, firing mechanism 830 is trigged. Firing mechanism 830 is a software process that identifies the trace identifier, such as trace identifier 826 associated with the trace location 829. Responsive to identifying trace identifier 826, the firing mechanism looks at each trace clause, such as trace clause 810 that is associated with the trace. A processor then executes the associated action for each trace clause, such as trace clause 810. As stated above, because the location of the trace is often complex, the link from the trace clause to the action may not be direct: the path may comprise a loop or other structure; however, the trace clause 810 can always be identified from the trace location 829.

Figure 9:
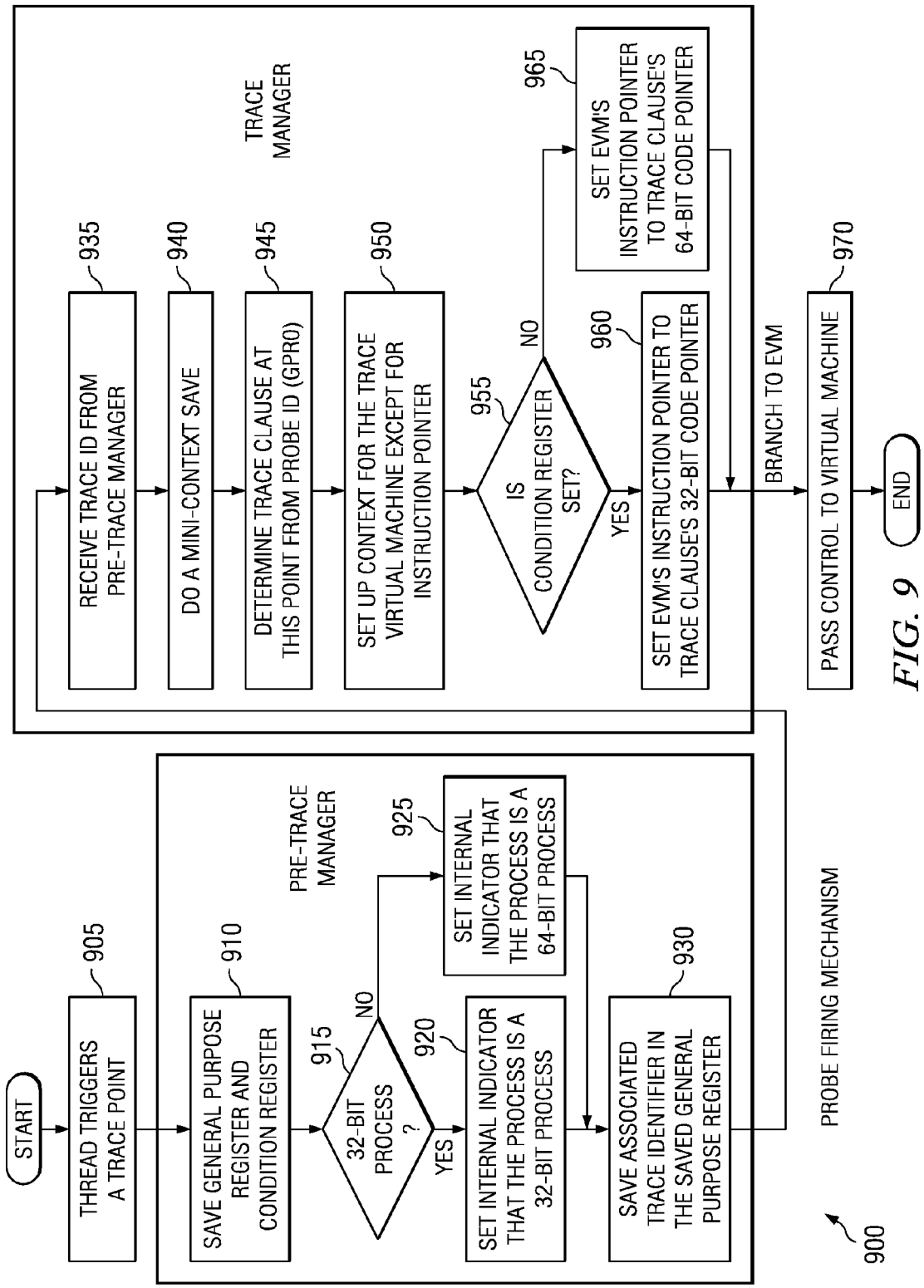
FIG. 9 is a process for performing a pre-trace within a trace firing mechanism responsive to a thread triggering a trace point according to an illustrative embodiment.

Referring now to FIG. 9, a process for performing a pre trace within a trace launching mechanism responsive to a thread triggering a trace point is shown according to an illustrative embodiment. Process 900 is a software process, executing on a software component, such as firing mechanism 830 of FIG. 8.

Process 900 begins when an active thread triggers a trace point (step 905) and identifies jump code associated with the triggered trace. There is a separate trampoline code associated with each trace identifier. When the trace point is triggered, the firing mechanism, such as firing mechanism 830 of FIG. 8, branches to the associated jump code for that trace point.

Responsive to the active thread triggers a trace point, process 900 saves a general purpose register and a condition register (step 910). A modification to the contents of the registers affects the behavior of the active thread process when it resumes execution. The compiler may save some specific values into these registers. Because these registers are not always volatile, an error may occur if the contents of that register are lost. Therefore, depending on where the trace point is inserted, saving these registers is necessary.

Process 900 then identifies whether the process is a 32-bit process (step 915). The check to identify a 32-bit process is made by checking state flags associated with this process's data structure in the kernel. This check can be made using only well-defined volatile registers and the single saved general purpose register.

Responsive to identifying that the process is a 32-bit process ("yes" at step 915), process 900 sets an internal indicator that the process is a 32-bit process (step 920). The indicator can be the setting or clearing of a corresponding bit in the saved condition register.

Responsive to not identifying that the process is a 32-bit process ("no" at step 915), process 900 sets an indicator that the process is a 64-bit process (step 925). The indicator can be the clearing or setting of a corresponding bit in the saved condition register. In one illustrative embodiment, the bit that is cleared is the same bit that can be set in step 920.

Process 900, continuing to execute the jump code, then saves its associated trace identifier in the saved general purpose register (step 930). The trace identifier to be saved is "hard-coded" inside the trampoline code depending upon which trace identifier it is associated with thus allowing this to be accomplished without availing any of the other general purpose registers.

Process 900 continues by receiving a trace identifier from a pre-trace manager (step 935). The pre-trace manager is a software process such as firing mechanism 830 of FIG. 8 and shown in more detail by as the jump code 900. The trace manager is entered with a general purpose register indicating the trace identifier and a condition register indicating the mode of the process (32-bit or 64-bit).

Responsive to receiving the trace identifier from the pre-trace manager, process 900 performs a mini-context save (step 940). The mini-context saves a few general purpose registers and some system registers like the machine state register, Responsive to performing the mini-context save, process 900 identifies the trace clause at this trace point from the trace identifier (step 945). To identify the trace clause, process 900 can follow a pointer associated with the general purpose register that is set at step 935 to the trace clause. The trace clause is a data structure, such as trace clause 600 of FIG. 6.

Responsive to identifying the trace clause at this trace point from the trace identifier, process 900 sets up a context for the trace virtual machine, excepting the instruction pointer (step 950). The virtual machine can be virtual machine 400 of FIG. 4. The context can include, but is not limited to, the status, condition or mode of the system, state information, variables contents, and bit settings.

Process 900 determines whether the process to be traced is a 32-bit process or a 64-bit process. In one illustrative embodiment, process 900 determines this by examining the condition register bit that was set or cleared by step 940 or 950. Thus in order to determine whether the traced process is a 32-bit process or a 64-bit process, process 900 can simply identify whether a corresponding condition register is set or cleared. In the present illustrative example, process 900 determines if the condition register is set (step 955).

Responsive to determining that the condition register is set ("yes" at step 955), process 900 sets the virtual machine instruction pointer to the trace clause's 32-bit code pointer (step 960). In this illustrative example, the set bit indicates that the process to be traced is a 32-bit process. Therefore, the pointer was set to indicate that the 32-bit trace instructions should be executed. Control of the trace is passed to the virtual machine (step 965), with the process terminating thereafter.

Returning now to step 955, responsive to determining that the condition register is not set ("no" at step 955), process 900 sets the virtual machine instruction pointer to the trace clause's 64-bit code pointer (step 965). In this illustrative example, the cleared bit indicates that the process to be traced is a 64-bit process. Therefore, the pointer was set to indicate that the 64-bit trace instructions should be executed. Control of the trace is passed to the virtual machine (step 970), with the process terminating thereafter.

A computer implemented method, a computer program product, and a data processing system trace information about current context and system state for either 32-bit or 64-bit applications. A 32-bit trace executable code and 64-bit trace executable code are compiled for a trace script. A determination is then made as to whether an application process is a 32-bit process or a 64-bit process. Responsive to determining that the application process is the 32-bit process or the 64-bit process, an internal indicator is set to indicate the application process as either a 32-bit process or a 64-bit process. Subsequently, the internal indicator is identified as either indicating the 32-bit process or the 64-bit process. If the internal identifier indicates the application process is a 32-bit process, an instruction pointer is set to indicate the 32-bit trace executable code, and the 32-bit trace executable code is executed. If the internal identifier indicates the application process is a 64-bit process, an instruction pointer is set to indicate the 64-bit trace executable code, and the 64-bit trace executable code is executed.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for tracing information about current context and system state for either 32-bit or 64-bit applications, the computer implemented method comprising:
   compiling, by a processor, a 32-bit trace executable code for a trace script and a 64-bit trace executable code for the trace script;
   determining, by the processor, whether an application process is a 32-bit process or a 64-bit process;

responsive to determining that the application process is the 32-bit process, indicating, by the processor, that the application process is the 32-bit process with an internal indicator, wherein the indicating comprises setting or clearing an internal indicator to indicate that the process is the 32-bit process, wherein the internal indicator comprises a corresponding bit in a saved condition register;

responsive to determining that the application process is the 64-bit process, indicating, by the processor, that the application process is the 64-bit process with the internal indicator, wherein the indicating comprises setting or clearing the internal indicator to indicate that the process is the 64-bit process, wherein the internal indicator comprises the corresponding bit in the saved condition register;

identifying, by the processor, the internal indicator as either indicating the 32-bit process or the 64-bit process;

responsive to identifying the internal indicator as indicating the 32-bit process, setting, by the processor, an instruction pointer to indicate the 32-bit trace executable code of the trace script;

responsive to setting an instruction pointer to indicate the 32-bit trace executable code, executing, by the processor, the 32-bit trace executable code of the trace script;

responsive to identifying the internal indicator as indicating the 64-bit process, setting, by the processor, an instruction pointer to indicate the 64-bit trace code of the trace script; and responsive to setting an instruction pointer to indicate the 64-bit trace executable code, executing, by the processor, the 64-bit trace executable code of the trace script.

2. The computer implemented method of claim 1, wherein the method is performed inside a virtual machine.

3. The computer implemented method of claim 1, further comprising:
 identifying, by the processor, the triggering of a trace point containing a trace identifier, wherein the trace point is triggered by an active thread;
 responsive to identifying the triggering of a trace point, branching, by the processor, to the trace script;
 wherein the step identifying the internal indicator as either indicating the 32-bit process or the 64-bit process is responsive to branching to the trace script.

4. The computer implemented method of claim 3, further comprising:
 responsive executing the 32-bit trace executable code, branching, by the processor, back to the active thread; and
 responsive to executing the 64-bit trace executable code, branching, by the processor, back to the active thread.

5. The computer implemented method of claim 3 further comprising:
 responsive to identifying the triggering of a trace point containing a trace identifier, determining, by the processor, whether a predicate within the trace script is satisfied, wherein the 32-bit trace executable code or the 64-bit trace executable code is executed only if the predicate within the trace script is satisfied.

6. The computer implemented method of claim 1, wherein the step of setting the internal indicator to indicate that the process is the 32-bit process further comprises setting, by the processor, the corresponding bit in the saved condition register; and
 wherein the step of setting the internal indicator to indicate that the process is the 64-bit process further comprises clearing, by the processor, the corresponding bit in the saved condition register.

7. A computer program product comprising:
 a tangible computer readable medium having computer usable program code for tracing information about current context and system state for either 32-bit or 64-bit applications, the computer program product comprising:
 computer usable program code for compiling a 32-bit trace executable code for a trace script and a 64-bit trace executable code for the trace script; computer usable program code for determining whether an application process is a 32-bit process or a 64-bit process;
 computer usable program code, responsive to determining that the application process is the 32-bit process, for indicating that the application process is the 32-bit process, wherein the indicating comprises setting or clearing an internal indicator to indicate that the process is the 32-bit process, wherein the internal indicator comprises a corresponding bit in a saved condition register;
 computer usable program code, responsive to determining that the application process is the 64-bit process, for indicating that the application process is the 64-bit process, wherein the indicating comprises setting or clearing the internal indicator to indicate that the process is the 64-bit process, wherein the internal indicator comprises the corresponding bit in the saved condition register;
 computer usable program code for identifying the internal indicator as either indicating the 32-bit process or the 64-bit process;
 responsive to identifying the internal indicator as indicating the 32-bit process, setting an instruction pointer to indicate the 32-bit trace executable code;
 computer usable program code, responsive to setting an instruction pointer to indicate the 32-bit trace executable code, for executing the 32-bit trace executable code;
 computer usable program code, responsive to identifying the internal indicator as indicating the 64-bit process, for setting an instruction pointer to indicate the 64-bit trace code; and
 computer usable program code, responsive to setting an instruction pointer to indicate the 64-bit trace executable code, for executing the 64-bit trace executable code.

8. The computer program product of claim 7, further comprising:
 computer usable program code for identifying the triggering of a trace point containing a trace identifier, wherein the trace point is triggered by an active thread;
 computer usable program code, responsive to identifying the triggering of a trace point, for branching to the trace script;
 wherein the computer usable program code for identifying the internal indicator as either indicating the 32-bit process or the 64-bit process is responsive to branching to the trace script.

9. The computer program product of claim 8, further comprising:
 computer usable program code, responsive executing the 32-bit trace executable code, for branching back to the active thread; and
 computer usable program code, responsive to executing the 64-bit trace executable code, for branching back to the active thread.

10. The computer program product of claim 8 further comprising:
 computer usable program code, responsive to identifying the triggering of a trace point containing a trace identifier, for determining whether a predicate within the trace script is satisfied, wherein the 32-bit trace executable code or the 64-bit trace executable code is executed only if the predicate within the trace script is satisfied.

11. The computer program product of claim 7, wherein the computer usable program code for setting the internal indicator to indicate that the process is the 32-bit process further comprises computer usable program code for setting the corresponding bit in the saved condition register; and
   wherein the computer usable program code for setting the internal indicator to indicate that the process is the 64-bit process further comprises computer usable program code for clearing the corresponding bit in the saved condition register.

12. A data processing system comprising:
   a bus;
   a communications unit connected to the bus;
   a storage device connected to the bus, wherein the storage device includes computer usable program code for tracing information about current context and system state for either 32-bit or 64-bit applications; and
   a processor unit connected to the bus, wherein the processor unit executes the computer usable program code to compile a 32-bit trace executable code for a trace script and a 64-bit trace executable code for the trace script, to determine whether an application process is a 32-bit process or a 64-bit process, responsive to determining that the application process is the 32-bit process, to indicate that the application process is the 32-bit process, wherein the indicating comprises setting or clearing an internal indicator to indicate that the process is the 32-bit process, wherein the internal indicator comprises a corresponding bit in a saved condition register, responsive to determining that the application process is the 64-bit process, to indicate that the application process is the 64-bit process, wherein the indicating comprises setting or clearing the internal indicator to indicate that the process is the 64-bit process, wherein the internal indicator comprises the corresponding bit in the saved condition register, to identify the internal indicator as either indicating the 32-bit process or the 64-bit process, responsive to identifying the internal indicator as indicating the 32-bit process, to set an instruction pointer to indicate the 32-bit trace executable code, responsive to setting an instruction pointer to indicate the 32-bit trace executable code, to execute the 32-bit trace executable code, responsive to identifying the internal indicator as indicating the 64-bit process, to set an instruction pointer to indicate the 64-bit trace code, and responsive to setting an instruction pointer to indicate the 64-bit trace executable code, to execute the 64-bit trace executable code.

13. The data processing system of claim 12, wherein the processor unit further executes the computer usable program code to identify the triggering of a trace point containing a trace identifier, wherein the trace point is triggered by an active thread, responsive to identifying the triggering of a trace point, to branch to the trace script, wherein the computer usable program code for identifying the internal indicator as either indicating the 32-bit process or the 64-bit process is responsive to branching to the trace script.

14. The data processing system of claim 12, wherein the step of setting the internal indicator to indicate that the process is the 32-bit process further comprises setting the corresponding bit in the saved condition register; and
   wherein the step of setting the internal indicator to indicate that the process is the 64-bit process further comprises clearing the corresponding bit in the saved condition register.

15. A computer implemented method for tracing information about current context and system state for applications, the computer implemented method comprising:
   compiling a plurality of trace executable code for applications having a different number of bits to form a trace script;
   identifying a number of bits in a process for an application process;
   responsive to identifying the number of bits, indicating that the application process has the number of bits with an internal indicator wherein the indicating comprises setting or clearing an internal indicator to indicate that the process has the number of bits, wherein the internal indicator comprises a corresponding bit in a saved condition register;
   setting an instruction pointer to a portion of trace executable code in the trace script corresponding to the number of bits; and
   responsive to setting the instruction pointer to the portion of the executable trace code, executing the portion of the executable trace code.

16. The computer implemented method of claim 15, further comprising:
   identifying the triggering of a trace point containing a trace identifier, wherein the trace point is triggered by an active thread;
   responsive to identifying the triggering of a trace point, branching to the trace script; and
   responsive to branching to the trace script, identifying the internal indicator as indicating one of the applications having a different number of bits.

* * * * *